Patented June 6, 1939

2,161,213

UNITED STATES PATENT OFFICE 2,161,213

SUBSTITUTED MALONIC ESTERS

Frank C. Whitmore, State College, David M. Jones, Forty Fort, and Clarence I. Noll, State College, Pa., assignors to Mallinckrodt Chemical Works, St. Louis, Mo., a corporation of Missouri No Drawing. Application February 10, 1936, Serial No. 63,212

4 Claims. (Cl. 260—485)

This invention relates to substituted malonic esters, and with regard to certain more specific features, to substituted malonic esters including at least one substituent group embodying a quaternary carbon atom.

Among the several objects of the invention may be noted the provision of substituted malonic esters corresponding to the type formula:

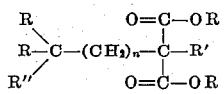

where any R is any alkyl, R' is hydrogen, or a alkyl, alkylene, alkinyl, cycloalkyl, aryl, aralkyl, aryl-oxy-alkyl, or alkyl-oxy-alkyl, R" is an alkyl or aryl, and $n$ is 1 or more. Other objects will be in part obvious and in part pointed out hereinafter.

The invention accordingly comprises the elements and combinations of elements, and features of composition which will be exemplified in the products hereinafter described, and the scope of the application of which will be indicated in the following claims.

Substituted malonic esters of the type herein set forth are valuable as intermediates for the preparation of several classes of substances, including substituted barbituric acids, ureides and long-chain aliphatic acids. It has heretofore been determined that the effectiveness of substituted barbituric acids or ureides as hypnotics, sedatives, or soporifics, depends in part upon the composition of the substituent groups, and it has also been noted that the more branched the substituent groups are, the more effective is the hypnotic or sedative or soporific action, without corresponding increase in undesirable qualities.

For these reasons, it is advantageous to produce, and have available, substituted malonic esters, as intermediates for the preparation of such barbituric acids, ureides, and long-chain acids, which themselves have highly branched substituent groups. It is the purpose of the present invention to provide for substituted malonic esters having substituent groups including a considerable number of branches through the use of a substituent group containing a quaternary carbon atom. A quaternary carbon atom, it will be understood, is one to which are directly attached four other carbon atoms. In the type formula given above, it will be seen that the limitations of the definitions for R and R" given, provide that the first carbon atom on the central line of the formula (at the left) is directly attached to four other carbon atoms, and hence is quaternary.

Substituted barbituric acids derived from substituted malonic esters of the present invention are described and claimed in the copending application of the present applicant Whitmore, and Melvin A. Thorpe, Serial No. 751,416, filed November 3, 1934.

Long-chain aliphatic acids derived from substituted malonic esters of the present invention are similarly described and claimed in the copending application of the present applicants Whitmore and Jones, together with August H. Homeyer and Walter R. Trent, Serial No. 666,513, filed April 17, 1933.

Substituted malonic esters of the type set forth herein have not heretofore been prepared because no satisfactory method has been known for obtaining the quaternary carbon-containing substituent in such form as to permit of its joining to the malonic acid nucleus. However, such a method has now been provided, based upon the availability of certain quaternary carbon-containing alkyl halides. The substance, 3,3-dimethyl-1-bromobutane, for example, is described and claimed in the patent of the present applicant Whitmore and Walter R. Trent, No. 2,022,485, dated November 26, 1935, while the substance 4,4-dimethyl-1-bromopentane and its higher homologs are described and claimed in the copending application of the present applicant Whitmore and August H. Homeyer, Serial No. 36,132, filed August 14, 1935.

Numerous examples of substances within the scope of the invention are set forth hereinafter, and for an exemplary number of these examples, details of procedure for the preparation thereof are set forth. It is to be understood, however, that the invention is by no means limited to the specific examples set forth.

For ease of classification in the subsequent description, the type formula given above is rewritten hereinafter, with the four R's separately distinguished by the subscripts $a$, $b$, $c$, and $d$:

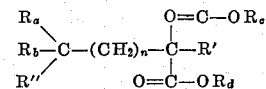

Throughout all of the examples given hereinafter, $R_c$ and $R_d$ are set forth as ethyl,

—$CH_2$—$CH_3$

This is by way of example only, and it will readily be seen that any other alkyl group may be used, merely by starting with the appropriate malonic ester. The substitution of one alkyl group for another as the esterifying radical on an acid is well within the province of any trained organic chemist.

In Examples 1, 2, and 3, which follow immediately hereafter, $R_a$ and $R_b$ are uniformly methyl, $R_c$ and $R_d$ are uniformly ethyl, $R'$ is uniformly hydrogen, and $R''$ is uniformly methy, but $n$ is varied, being 2 in Example 1, 3 in Example 2, and 4 in Example 3. Examples 4, 5 and 6 are identical to Examples 1, 2 and 3, respectively, except that $R'$ is ethyl. Examples 7 and 8 are identical to Examples 4, 5 and 6, except that $n$ is further varied, being 5 and 6, respectively. This group of examples is put forth, as stated above, to show variations in $n$.

EXAMPLE 1

1,1-dicarbethoxy-4,4-dimethylpentane

This substance, which has the following structural formula:

$$(CH_3)_3C—CH_2—CH_2—CH(COOC_2H_5)_2$$

may be prepared by condensing diethyl malonate with the substance 3,3-dimethyl-1-bromobutane, according to the reaction:

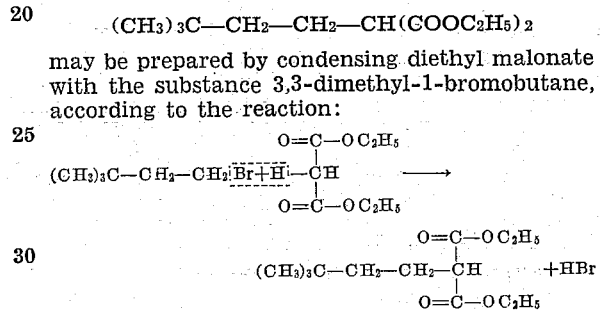

The starting material, diethyl malonate, is commercially obtainable. The other starting material, 3,3-dimethyl-1-bromobutane, is obtained in the manner set forth in said Patent No. 2,022,485.

For example, the following procedure may be used: 500 cc. of absolute ethyl alcohol, dried with magnesium methylate, is distilled directly from the magnesium methylate into a two-liter three-necked flask fitted with a reflux condenser, a thermometer, a mercury-sealed stirrer, and a dropping funnel, all of which are thoroughly dry. 23 grams of metallic sodium are now added to the ethyl alcohol, and after the solution cools to 30° C., 161 grams of diethyl malonate are added over a period of time, such as two to three hours. The temperature of the solution does not change during the addition. Then 166 grams of 3,3-dimethyl-1-bromobutane are added to the solution over a period of time, such as one to two hours. No precipitate forms and the solution does not become warm during the addition. The reaction mixture is now heated on a water bath, and when the temperature reaches 66° C., a precipitate begins to form. The mixture is refluxed for about seven hours, at the end of which it is still alkaline to litmus paper, and a muddy brown in color. The alcohol is now distilled off, and the ester layer separated from the residue by adding 300 cc. of water. The ester layer is washed with a further portion of 100 cc. of water, which is then added to the first water portion. The combined water portions are then extracted with successive 200, 100, and 100 cc. portions of ether, all of which ether portions are then added to the ester layer. The ester layer is now dried with 25 grams of anhydrous sodium sulphate and distilled. The product ester 1,1-dicarbethoxy-4,4-dimethylpentane, is a colorless liquid, and is obtained in a yield of about 191 grams, or 78.3% of the theoretical yield. It boils at about 77° to 78.5° C. under 1 to 2 mm. pressure, has an index of refraction value of about 1.4278, and a density of 0.9541. Its calculated molecular refraction is 65.82, which is a close check to the theoretical value of 65.54.

EXAMPLE 2

1,1-dicarbethoxy-5,5-dimethylhexane

This is the next higher homolog of the substance set forth in Example 1, and has the following structural formula:

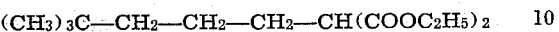

It may be prepared from diethyl malonate by the procedure of Example 1, substituting 4,4-dimethyl-1-bromopentane for the 3,3-dimethyl-1-bromobutane of Example 1. 4,4-dimethyl-1-bromopentane is obtained in pure form by following the procedure set forth in said copending application Serial No. 36,132. Detailed instructions for the condensation procedure follow, and will serve as exemplary for this entire series of homologous compounds:

11.5 grams of metallic sodium are dissolved in absolute ethyl alcohol. The solution is then cooled to about 40° C., and 81 grams of diethyl malonate are added. Then 90 grams of 4,4-dimethyl-1-bromopentane (boiling at 68° C. under 35 mm. pressure) are added. A mechanical stirrer and a reflux condenser are fitted to the flask and the mixture is then heated, on a steam bath, to a refluxing temperature, and is held there, with constant stirring, until a sample is no longer alkaline to litmus paper. The reaction mixture is protected from moisture and from the air. When the mixture is no longer alkaline, and no more sodium bromide separates, the condenser is set for downward distillation and the alcohol is distilled off. The residue is then cooled, and dissolved in about 200 cc. of water. The upper layer is separated and fractionated through a suitable column.

The desired ester product, thus fractionated, is obtained in a yield of about 77 grams, and is a colorless oily liquid, boiling at about 125° C. under 2 to 3 mm. pressure, and has an index of refraction of about 1.4281 to 1.4288.

EXAMPLE 3

1,1-dicarbethoxy-6,6-dimethylheptane

This is the next higher homolog of the substance set forth in Example 2, and has the following structural formula:

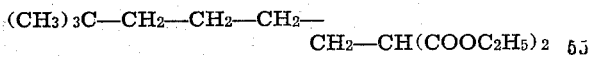

It may be prepared from diethyl malonate by the procedure of Example 1, substituting 5,5-dimethyl-1-bromohexane for the 3,3-dimethyl-1-bromobutane of Example 1. 5,5-dimethyl-1-bromohexane is obtained in pure form by following the procedure set forth in said copending application Serial No. 36,132.

EXAMPLE 4

2,2-dimethyl-5,5-dicarbethoxyheptane

This substance, which has the following structural formula:

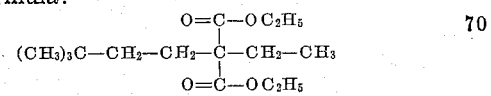

may be prepared by condensing diethyl ethylmalonate (commercially obtainable) with the 3,3-dimethyl-1-bromobutane aforesaid, according to the reaction:

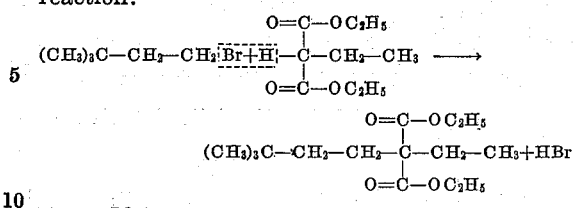

From 56.4 grams of diethyl ethylmalonate and 49.5 grams of the bromide, following substantially the detailed procedure of Example 2, a yield of 36.1 grams of the pure ester may be obtained. The pure ester is an oily liquid, boiling at from 148° to 151° C. under atmospheric pressure, and has an index of refraction of about 1.4320.

EXAMPLE 5

2,2-dimethyl-6,6-dicarbethoxyoctane

This substance, which has the following structural formula:

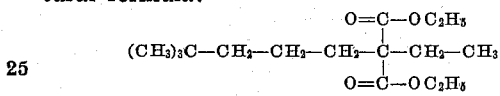

may be prepared by condensing diethyl ethylmalonate (commercially obtainable) with the 4,4-dimethyl-1-bromopentane aforesaid, according to a reaction analogous to that set forth in Example 4 herein.

The product ester is a colorless liquid, boiling at 126° to 128° C., under 4 to 5 mm. pressure, and has an index of refraction of 1.4320, and a density of 0.9365.

EXAMPLE 6

2,2-dimethyl-7,7-dicarbethoxynonane

This substance, which has the following structural formula:

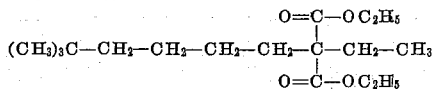

may be prepared from diethyl ethylmalonate by the procedure of Example 4, by substituting 5,5-dimethyl-1-bromohexane for the 3,3-dimethyl-1-bromobutane of Example 4. 5,5-dimethyl-1-bromohexane may be prepared in pure form by following the procedure set forth in said copending application, Serial No. 36,132.

The product ester is a colorless liquid boiling at 129° to 130° C., under 3 to 5 mm. pressure, has a density of 0.9367, and an index of refraction of 1.4361.

EXAMPLE 7

2,2-dimethyl-8,8-dicarbethoxydecane

This substance, which has the following structural formula:

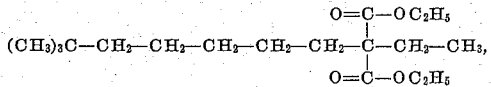

may be prepared from diethyl ethylmalonate by the procedure of Example 4, by substituting 6,6-dimethyl-1-bromoheptane for the 3,3-dimethyl-1-bromobutane of Example 4. 6,6-dimethyl-1-bromoheptane may be prepared in pure form by following the procedure set forth in said copending application Serial No. 36,132.

The product ester is a colorless liquid, boiling at 138° to 140° C., under 3 to 4 mm. pressure, has a density of 0.933, and an index of refraction of 1.4387.

EXAMPLE 8

2,2-dimethyl-9,9-dicarbethoxyundecane

This substance, which has the following structural formula:

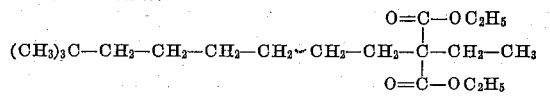

may be prepared from diethyl ethylmalonate by the procedure of Example 4, by substituting 7,7-dimethyl-1-bromo-octane for the 3,3-dimethyl-1-bromobutane of Example 4. 7,7-dimethyl-1-bromo-octane may be obtained in pure form by following the procedure set forth in said copending application Serial No. 36,132.

The following Examples 9, 10, and 11 differ principally from the preceding examples in that R'', which has previously been uniformly methyl, is now varied to ethyl (in Examples 9 and 10) and phenyl (Example 11).

EXAMPLE 9

3,3-dimethyl-7,7-dicarbethoxynonane

The structural formula of this substance is as follows:

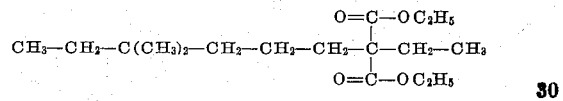

It is prepared from diethyl ethylmalonate according to the procedure of Example 4, but using 4,4-dimethyl-1-bromohexane in place of the 3,3-dimethyl-1-bromobutane of Example 4. 4,4-dimethyl-1-bromohexane may be obtained in pure form by following the procedure set forth in said copending application Serial No. 36,132.

The product ester is a colorless liquid, boiling at 127° to 128° C., under 2 to 3 mm. pressure, has a density of 0.941, and an index of refraction of 1.4380.

EXAMPLE 10

3,3-dimethyl-9,9-dicarbethoxyundecane

This substance, which has the following structural formula:

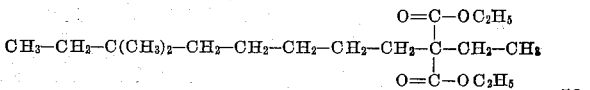

may be prepared from diethyl ethylmalonate according to the procedure of Example 4, but using 6,6-dimethyl-1-bromo-octane in place of the 3,3-dimethyl-1-bromobutane of Example 4. 6,6-dimethyl-1-bromo-octane may be obtained in pure form by following the procedure set forth in said copending application Serial No. 36,132.

EXAMPLE 11

2-methyl-2-phenyl-5,5-dicarbethoxyheptane

This substance, which has the following structural formula:

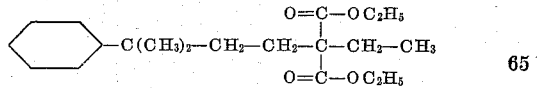

may be prepared from diethyl ethylmalonate and 3-methyl-3-phenyl-n-butyl bromide according to the procedure of Example 4. The bromide, which is not elsewhere disclosed, is made in the following manner:

2,2-dimethyl-2-phenyl propionic acid, prepared in the manner set forth by A. Hoffman in the Journal of the American Chemical Society for 1929, volume 51, page 2542, is used as the starting material. To 410 grams of this substance are added 800 grams of n-butyl alcohol and 15 cc. of concentrated sulphuric acid, and the mixture is then refluxed for 6 hours and allowed to stand over night. The product is washed with water and then sodium carbonate solution until free of acid. The ester, n-butyl 2,2-dimethyl-2-phenyl propionate, is then dried with sodium sulphate and fractionated. It boils at 131° to 133° C., under 4 to 5 mm. pressure, and has an index of refraction of 1.4896.

234 grams of this ester are mixed with 480 cc. of dry n-butyl alcohol and set aside. In a copper flash fitted with copper condensers are placed 140 grams of metallic sodium and 500 cc. of dry toluene, and the flask is heated until the sodium melts. Thereafter, with vigorous stirring, the ester-alcohol mixture is added, the addition taking about six minutes. Immediately thereafter 1200 cc. of dry n-butyl alcohol is added, this addition likewise taking about six minutes. In a very short time the reaction is complete. The mixture is then refluxed for ½ hour, cooled, and 1½ liters of water carefully added. The mixture is then poured into a 5-liter flask and the butyl alcohol is steam-distilled from the alkaline solution. The remaining oily layer is separated and the water layer extracted with ether, which is added to the oily layer. The oily layer is then washed with water until free of sodium hydroxide, is dried with sodium sulphate, and is then fractionated. The product, 3-methyl-3-phenylbutanol-1, is a liquid boiling at 127° to 128° C., under 10 mm. pressure, and has an index of refraction of 1.5210.

103 grams of this alcohol are cooled to —5° to 0° C. in a salt-ice bath, and 70 grams of phosphorous tribromide are added, with vigorous stirring, over a period of 1½ hours. Then the mixture is continuously stirred until it reaches room temperature, and it is then allowed to stand over night. It is then poured on ice and made alkaline to litmus paper with a solution of sodium hydroxide. The oil is extracted with ether, dried with calcium chloride, and then fractionated. The product, 3-methyl-3-phenyl-n-butyl bromide, is a colorless liquid boiling at 120° to 121° C., under 10 mm. pressure, and has an index of refraction of 1.5390.

The reaction of this bromide with diethyl ethylmalonate proceeds in the same manner as that set forth in Example 4, and hence will not be repeated in detail here. The product ester, 2-methyl-2-phenyl-5,5-dicarbethoxyheptane, is a colorless liquid boiling at 162° to 163° C. under 3 mm. pressure, and has an index of refraction of 1.4858.

The following Examples 12 through 24 differ principally from the preceding examples in that R', which has previously been either hydrogen (Examples 1, 2, and 3) or ethyl (Examples 4 through 11), is now varied through a wide range of alkyls, alkylenes, alkinyls, cycloalkyls, aryls, aralkyls, aryl-oxy-alkyls, and alkyl-oxy-alkyls.

EXAMPLE 12

*2,2-dimethyl-6,6-dicarbethoxyheptane*

This substance, which has the following structural formula:

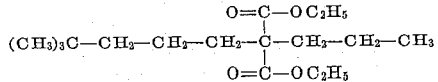

shows R' as a methyl (alkyl) group. It may be prepared from diethyl methylmalonate, which is commercially obtainable, by the procedure of Example 2, with the aforesaid 4,4-dimethyl-1-bromopentane.

EXAMPLE 13

*2,2-dimethyl-6,6-dicarbethoxynonane*

This substance, which has the following structural formula:

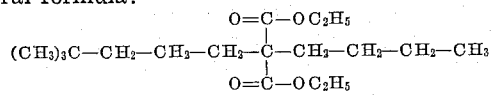

shows R' as an n-propyl (alkyl) group. It may be prepared from diethyl n-propylmalonate, which is commercially obtainable, by the procedure of Example 2, with the aforesaid 4,4-dimethyl-1-bromopentane.

EXAMPLE 14

*2,2-dimethyl-6,6-dicarbethoxydecane*

This substance, which has the following structural formula:

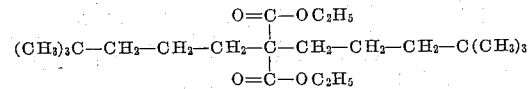

shows R' as an n-butyl (alkyl) group. It may be prepared from diethyl n-butylmalonate, which is commercially obtainable, by the procedure of Example 2, using the aforesaid 4,4-dimethyl-1-bromopentane.

EXAMPLE 15

*6,6-dicarbethoxy-2,2,10,10-tetramethylundecane*

This substance, which has the following structural formula:

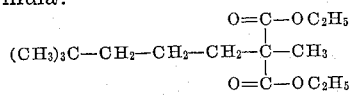

shows R' as a 4,4-dimethylpentyl (alkyl) group. It is of particular interest, as it provides two quaternary-carbon-containing substituents on the central carbon atom of the malonic acid nucleus. This substance is prepared from the substance 1,1 - dicarbethoxy - 5,5 - dimethylhexane (comprising Example 2 of the present application) by condensing it with an additional mole of 4,4-dimethyl-1-bromopetane, according to the reaction:

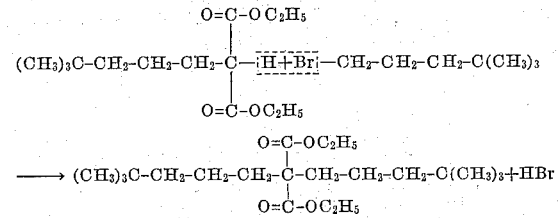

While the details of procedure do not differ substantially from those set forth in Example 2, they will be given for the sake of an example:

2.6 grams of metallic sodium were dissolved in 100 cc. of absolute ethyl alcohol which had been refluxed with sodium and then redistilled. This solution of sodium ethylate was then cooled to about 40° C., and 37.5 grams of 1,1-dicarbethoxy-5,5-dimethylhexane, prepared as in Example 2, and 21 grams of 4,4-dimethyl-1-bromopetane were added to it. The mixture was refluxed for about two days. The ethyl alcohol was then distilled off, the mixture cooled to about 40° C., and the crystallized sodium bromide dissolved in warm water. The oily layer was then separated and fractionated, yielding 27 grams of the desired ester product.

The product ester is a colorless oily liquid, boiling at 152° C. under 2 mm. pressure, and has an index of refraction of about 1.4350.

EXAMPLE 16

*8,8-dimethyl-4,4-dicarbethoxynonene-1*

This substance, which has the following structural formula:

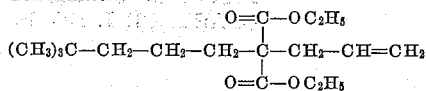

shows R′ as an allyl (alkylene) group. It may be prepared from diethyl allylmalonate, which is commercially obtainable, by the procedure of Example 2, using the aforesaid 4,4-dimethyl-1-bromopentane.

EXAMPLE 17

*8,8-dimethyl-4,4-dicarbethoxynonine-1*

This substance, which has the following structural formula:

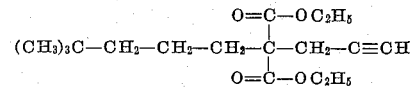

shows R′ as a propargyl (alkinyl) group. It may be prepared from diethyl propargylmalonate (which may in turn be prepared by well-known methods) by the procedure of Example 2, using the aforesaid 4,4-dimethyl-1-bromopentane.

EXAMPLE 18

*1,1-dicarbethoxy-1-cyclopentyl-5,5-dimethylhexane*

This substance, which has the following structural formula:

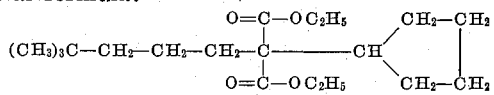

shows R′ as a cyclopentyl (cycloalkyl) group. It may be prepared from diethyl cyclopentylmalonate (which may in turn be prepared by well-known methods) by the procedure of Example 2, using the aforesaid 4,4-dimethyl-1-bromopentane.

EXAMPLE 19

*1,1-dicarbethoxy-1-cyclohexyl-5,5-dimethylhexane*

This substance, which has the following structural formula:

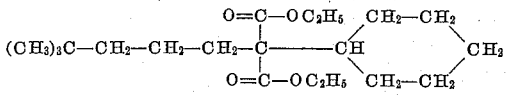

shows R′ as a cyclohexyl (cycloalkyl) group. It may be prepared from diethyl cyclohexylmalonate (which may in turn be prepared by well-known methods) by the procedure of Example 2, using the aforesaid 4,4-dimethyl-1-bromopentane.

EXAMPLE 20

*1,1-dicarbethoxy-1-phenyl-5,5-dimethylhexane*

This substance, which has the following structural formula:

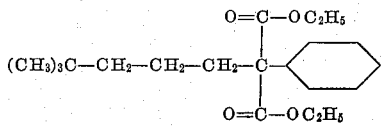

shows R′ as a phenyl (aryl) group. It may be prepared from diethyl phenylmalonate, which is commercially obtainable, by the procedure of Example 2, using the aforesaid 4,4-dimethyl-1-bromopentane.

The product ester is a colorless liquid boiling at 156° C., under 3 mm. pressure, has a density of 1.0052, and an index of refraction of 1.4810.

EXAMPLE 21

*2,2-dicarbethoxy-1-phenyl-6,6-dimethylheptane*

This substance, which has the following structural formula:

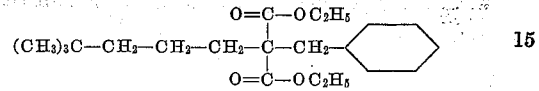

shows R′ as a benzyl (aralkyl) group. It may be prepared from diethyl benzylmalonate, which is commercially obtainable, by the procedure of Example 2, using the aforesaid 4,4-dimethyl-1-bromopentane.

EXAMPLE 22

*3,3-dicarbethoxy-1-phenyl-7,7-dimethyloctane*

This substance, which has the following structural formula:

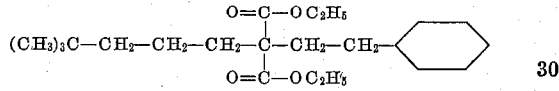

shows R′ as a beta-phenylethyl (aralkyl) group. It may be prepared from diethyl beta-phenylethylmalonate, which is commercially obtainable, by the procedure of Example 2, using the aforesaid 4,4-dimethyl-1-bromopentane.

EXAMPLE 23

*3,3-dicarbethoxy-1-phenoxy-7,7-dimethyloctane*

This substance, which has the following structural formula:

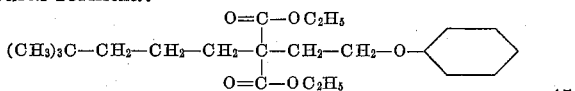

shows R′ as a phenoxyethyl (aryl-oxy-alkyl) group. It may be prepared from diethyl phenoxyethylmalonate (which may in turn be prepared by well-known methods) by the procedure of Example 2, using the aforesaid 4,4-dimethyl-1-bromopentane.

EXAMPLE 24

*3,3-dicarbethoxy-1-ethoxy-7,7-dimethyloctane*

This substance, which has the following structural formula:

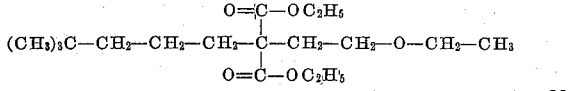

shows R′ as an ethoxyethyl (alkyl-oxy-alkyl) group. It may be prepared from diethyl ethoxyethylmalonate (which may in turn be prepared by well-known methods) by the procedure of Example 2, using the aforesaid 4,4-dimethyl-1-bromopentane.

Throughout this application, temperatures are given in degrees centigrade, pressures in millimeters of mercury, indices of refraction with respect to the sodium-D line at 20° C., and densities at 20° C. with respect to water at 4° C.

In view of the above, it will be seen that the several objects of the invention are achieved and other advantageous results attained.

As many changes could be made in carrying out the above compositions and processes without departing from the scope of the invention, it is intended that all matter contained in the above description shall be interpreted as illustrative and not in a limiting sense.

We claim:

1. A substituted malonic ester corresponding to the type formula:

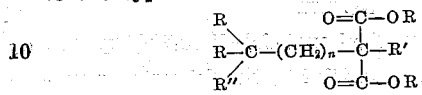

where any R is any alkyl, R' is a substituent selected from the group composed of hydrogen and hydrocarbon radicals, aryl-oxy-alkyls, and alkyl-oxy-alkyls, R'' is a hydrocarbon radical, and $n$ is at least 1.

2. 1,1-dicarbethoxy-4,4-dimethylpentane.
3. 2,2-dimethyl-5,5-dicarbethoxyheptane.
4. 6,6-dicarbethoxy - 2,2,10,10 - tetramethylundecane.

FRANK C. WHITMORE.
DAVID M. JONES.
CLARENCE I. NOLL.